US006766276B1

(12) United States Patent
Dury (10) Patent No.: US 6,766,276 B1
(45) Date of Patent: Jul. 20, 2004

(54) METHOD AND DEVICE FOR DETECTING A DYSFUNCTION OF AN ULATRASONIC FLOWMETER

(75) Inventor: Herve Dury, Macon (FR)

(73) Assignee: Actaris S.A.S. (FR)

( * ) Notice: Subject to any disclaimer, the term of this patent is extended or adjusted under 35 U.S.C. 154(b) by 0 days.

(21) Appl. No.: 10/169,339

(22) PCT Filed: Dec. 29, 1999

(86) PCT No.: PCT/FR00/03590

§ 371 (c)(1),
(2), (4) Date: Sep. 30, 2002

(87) PCT Pub. No.: WO01/50095

PCT Pub. Date: Jul. 12, 2001

(30) Foreign Application Priority Data

Dec. 29, 1999 (FR) .......................................... 99 16699

(51) Int. Cl.[7] ................................................ G06F 11/30
(52) U.S. Cl. ......................... 702/185; 702/35; 702/45; 702/82; 702/185; 73/1.59; 73/1.31; 340/606; 324/357
(58) Field of Search .............................. 702/35, 45, 53, 702/1, 82–185; 73/1.59, 1.31; 340/606–609; 324/357

(56) References Cited

U.S. PATENT DOCUMENTS

| | | | | |
|---|---|---|---|---|
| 4,188,624 A | * | 2/1980 | Hochsprung et al. | ....... 340/606 |
| 4,882,934 A | * | 11/1989 | Leffert et al. | ............. 73/861.04 |
| 4,966,141 A | * | 10/1990 | Bacaner et al. | ......... 128/207.14 |
| 5,321,973 A | * | 6/1994 | Sogawa | ...................... 73/35.04 |
| 5,627,759 A | * | 5/1997 | Bearden et al. | ................ 702/62 |
| 5,804,739 A | | 9/1998 | Herrmann et al. | ........ 73/861.18 |
| 6,226,598 B1 | * | 5/2001 | De Vanssay et al. | ......... 702/48 |
| 6,606,916 B2 | * | 8/2003 | Bignell et al. | ............ 73/861.27 |

FOREIGN PATENT DOCUMENTS

| | | |
|---|---|---|
| EP | 0797105 | 9/1997 |
| EP | 0829734 | 3/1998 |
| GB | 2022255 | 12/1979 |

OTHER PUBLICATIONS

Turnbull et al., 'Ultrasound Backscatter Microscope for Skin Imaging', Jan. 1993, IEEE, pp. 985–988.*
International Search Report dated May 4, 2001.

* cited by examiner

Primary Examiner—Marc S. Hoff
Assistant Examiner—Elias Desta
(74) Attorney, Agent, or Firm—Sofer & Haroun, LLP (57) ABSTRACT

A method for detecting malfunctions in a flowmeter includes the measuring of the receive signal $V_{IN}$ output by a transducer. A characteristic of the receive signal is compared to a predetermined reference characteristic $V_{REF}$ and the peak voltage $V_{PK}$ of the receive signal is stored. An alarm signal $V_{AL}$ is generated when a trigger characteristic $V_{DEC}$ of the receive signal is less than the predetermined reference characteristic. A threshold voltage $V_{TH}$ is defined, proportional to the peak amplitude $V_{PK}$ of the receive signal in such a manner that $V_{TH} = K \times V_{PK}$ where K is a factor depending on the transducer. The receive signal is compared with the threshold voltage and a conditioned output signal $V_{OUT}$ is generated in a first state when the receive signal is greater than the threshold voltage, and in a second state when the receive signal is less than the threshold voltage.

17 Claims, 4 Drawing Sheets

METHOD AND DEVICE FOR DETECTING A DYSFUNCTION OF AN ULATRASONIC FLOWMETER

The invention relates to a method and apparatus for detecting malfunction such as clogging or aging of a flowmeter including at least one transducer, and serving also to generate a conditioned signal based on an analog signal from said transducer.

The invention is applicable in measurement systems where accuracy depends on a magnitude which, although not metrological, must remain within a certain range in order to ensure that the measurement system operates properly. By way of example, in the field of measuring the flow rate of a fluid such as gas or water, for example, ultrasound flowmeters can be used. Such flowmeters generally comprise two ultrasound transducers disposed in a flow of fluid. In use, the transducers alternate between acting as an emitter and as a receiver. In order to measure the propagation time of a sound wave between the two transducers, one known method consists in exciting the emitter transducer with an excitation pulse. That pulse causes the emitter transducer to emit an ultrasound wave into the medium between the two transducers. The wave propagates towards the receiver transducer. The method consists in detecting the first oscillation of said wave on its arrival at the receiver transducer. The propagation time is then the time between the instant at which the emitter transducer is subjected to the excitation pulse and the instant at which the first oscillation of the wave reaching the receiver transducer is detected. The method consists in detecting the first oscillation of the wave by detecting when a voltage threshold is crossed. That method makes it necessary firstly to detect very low voltage levels, and secondly to have accurate control over the trigger threshold of the device for detecting the arrival of an oscillation so as to avoid introducing a delay in measuring the propagation time. When propagating through a fluid that is flowing, ultrasound waves take different lengths of time to propagate between the two transducers respectively in the upstream direction and in the downstream direction, and the flow rate of the fluid can be calculated from this difference. The two transducers are associated with an electronic circuit. The circuit controls the transducers and analyzes the analog signals delivered by the receiver transducer. One such device is described in greater detail in patent EP 0 426 309. Although the amplitude of the analog signal output by the receiver transducer is not a parameter that is required for computing flow rate, this magnitude must nevertheless present some minimum value in order to ensure that the electronic system associated with the transducers operates properly and in order to guarantee some minimum level of accuracy in flow rate measurement.

A problem that is frequently encountered with flowmeters of that type is that they become clogged up by particles entrained in the flowing fluid. In particular, these particles deposit on all of the "hydraulic" portions of the flowmeter, for example on the active surfaces of the transducers and/or on the mirrors for modifying the path followed by waves within the fluid. Such clogging inevitably attenuates the waves that are transmitted and thus decreases the amplitude of the signal delivered by the receiver transducer. When clogging becomes extreme, the electronic system malfunctions since it is no longer able to process the analog signal output by the receiver transducer. Until now, this problem has been solved by dismantling and verifying the amount of clogging inside the flowmeter after some determined length of time. Naturally, such a solution presents a significant maintenance cost and is not satisfactory insofar as flowmeter clogging depends on the quality and the type of the impurities present in the flowing fluid.

An object of the invention is to mitigate those drawbacks by implementing a method and a device for detecting malfunction such as clogging or aging in an ultrasound flowmeter, said flowmeter having at least one transducer, and said method also making it possible to generate a conditioned signal on the basis of an analog signal coming from said transducer. Such a method and device make it possible to warn the user or the maintenance team that it is necessary to clean the flowmeter if it is becoming clogged or to replace it if it is aging.

Another object of the invention is to servo-control certain parameters of the electronic system in order to increase the operating range of said electronic system.

In the invention, these objects are achieved by a method comprising the following steps:

measuring the receive signal $V_{IN}$ output by the transducer; and comparing a characteristic of the receive signal with a predetermined reference characteristic $V_{REF}$;

said method being characterized in that it comprises the following additional steps:

storing a peak voltage $V_{PK}$ of the receive signal $V_{IN}$;

generating an alarm signal $V_{AL}$ when a trigger characteristic $V_{DEC}$ of the receive signal $V_{IN}$ is less than the predetermined reference characteristic $V_{REF}$;

defining a threshold voltage $V_{TH}$ proportional to the peak amplitude $V_{PK}$ of the receive signal in such a manner that $V_{TH}=K \times V_{PK}$, K being a factor depending on the transducer;

comparing the receive signal $V_{IN}$ with the threshold voltage $V_{TH}$; and generating a conditioned output signal $V_{OUT}$ in a first state when the receive signal $V_{IN}$ is greater than the threshold voltage $V_{TH}$, and in a second state when the receive signal $V_{IN}$ is less than the threshold voltage $V_{TH}$.

In a first variant implementation, the reference characteristic $V_{REF}$ is a voltage, and the trigger characteristic $V_{DEC}$ is the peak voltage $V_{PK}$ of the receive signal $V_{IN}$.

In a second variant implementation, the reference characteristic $V_{REF}$ is a derivative of voltage, and the trigger characteristic $V_{DEC}$ is a derivative of the peak voltage $V_{PK}$ of the receive signal $V_{IN}$.

An advantage of this method of detecting malfunction lies in the fact that the receive signal $V_{IN}$ output by the transducer is used simultaneously for generating the alarm signal $V_{AL}$, the conditioned output signal $V_{OUT}$, and for defining the threshold voltage $V_{TH}$.

The device comprises:

a transducer delivering a receive signal $V_{IN}$; and a conditioning circuit (1) for conditioning the receive signal and comprising an input IN connected to the transducer, and an output OUT delivering a conditioned output signal $V_{OUT}$;

the conditioning circuit comprising:

a selector (10) having its input connected to the input IN, and receiving the value of the predetermined reference voltage $V_{REF}$, said selector delivering at its output a threshold voltage $V_{TH}$ that is servo-controlled to the receive signal $V_{IN}$, and at its output AL a malfunction detection signal $V_{AL}$ whenever the peak amplitude of the receive signal $V_{PK}$ is below a predetermined reference voltage $V_{REF}$; and a comparator (20) having a first input connected to the input IN receiving the receive signal $V_{IN}$ and a second input connected to the selector receiving the threshold voltage $V_{TH}$, an output of the comparator constituting the output OUT of the conditioning circuit generating a conditioned output signal $V_{OUT}$ having a first state when the amplitude of the receive signal is greater than the value of the threshold voltage, and a second state when the amplitude of the receive signal is less than the value of the threshold voltage $V_{Th}$.

Thus, by using a modulatable threshold voltage $V_{TH}$ it is possible to extend the operating range of the electronics significantly relative to the amplitude of the receive signals and compared with using a fixed comparison threshold.

In addition, the servo-control performed in this way on the threshold voltage $V_{TH}$ enables propagation time measurements to be made from the second or third oscillation of the receive signal, and that cannot be envisaged with a fixed threshold that is not servo-controlled to the peak voltage $V_{PK}$.

By way of example, the output signal AL is in a second state providing the entire measurement system is operating correctly. As soon as a malfunction is detected, the output signal AL switches into a first state corresponding to issuing the signal $V_{AL}$ indicating that malfunction has been detected. Alternatively, the malfunction detection signal can be a pulse, or a succession of pulses emitted over a determined length of time.

The reference voltage $V_{REF}$ is initially selected to be equal to a first reference voltage $V_{REF1}$. The reference voltage $V_{REF1}$ is selected in such a manner that the alarm signal is generated before the transducer ceases to deliver any receive signal. Thereafter, i.e. as soon as a first alarm signal $V_{AL}$ has been generated, the reference voltage $V_{REF}$ is modified and is selected to be equal to a second reference voltage $V_{REF2}$, the second reference voltage $V_{REF2}$ being lower than the first reference voltage $V_{REF1}$ so that a second alarm signal is generated when the transducer ceases to deliver any receive signal.

Thus, using a modulatable reference voltage $V_{REF}$ makes it possible to issue an alarm signal before the signal output by the transducer has become completely unusable. Furthermore, the receive signal remains sufficient for the device as a whole to continue operating until the second alarm is issued, while allowing for the necessary measures to be taken to repair, clean, or change the measuring device.

Other advantages and characteristics of the invention appear on reading the following description given by way of example and made with reference to the accompanying drawings, in which.

Figure 1:
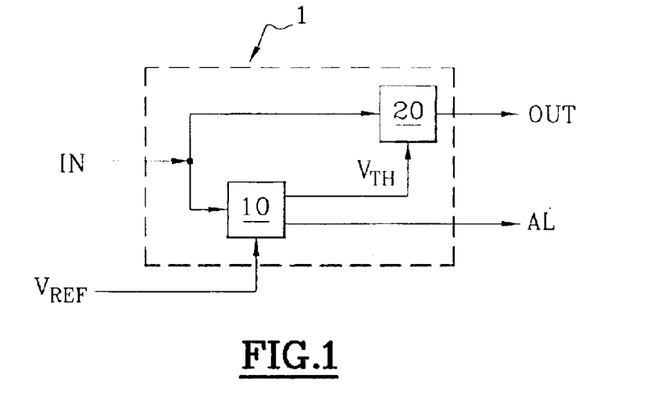
FIG. 1 is a block diagram of the malfunction detector device in a first embodiment of the invention, without any processing of the offset voltage.
Figure 2:
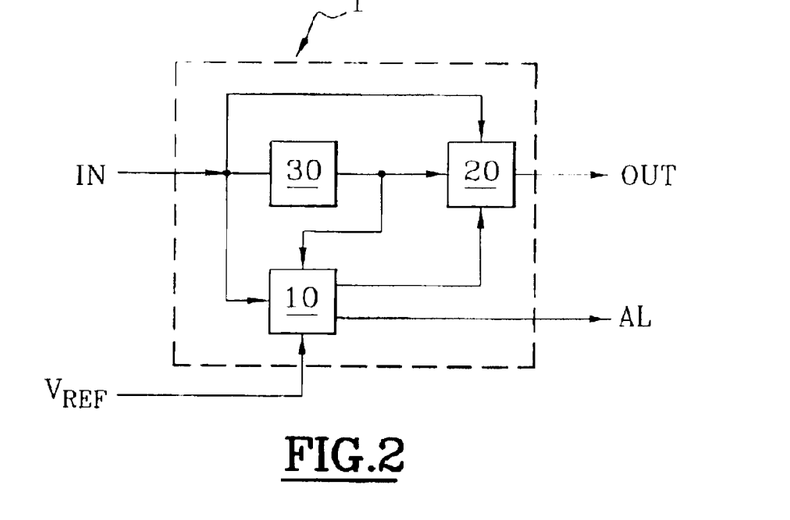
FIG. 2 is a block diagram of the malfunction detector device in a second embodiment of the invention, with processing of the offset voltage.
Figure 3:
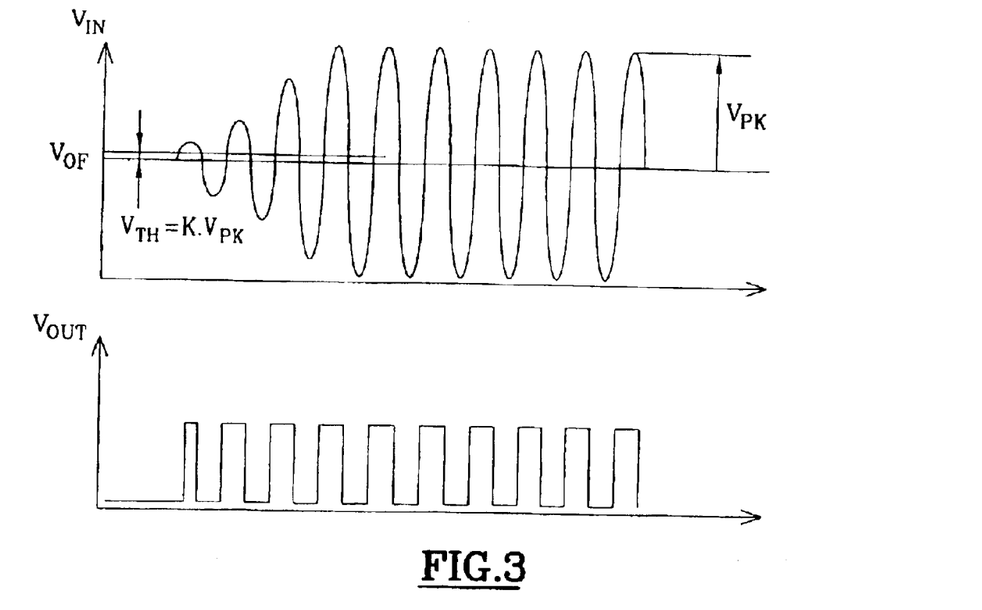
FIG. 3 shows the receive signal $V_{IN}$ together with the output signal.

As shown in FIGS. 1 and 2, a device of the invention comprises a conditioning circuit 1 connected in conventional manner to a transducer (not shown) via an input IN and to an ASIC (not shown) via an output OUT, the ASIC being designed to determine the above-mentioned propagation time. On being subjected to a mechanical action, e.g. an ultrasound wave, the transducer delivers an analog signal referred to as a "receive" signal $V_{IN}$. This signal comprises a series of characteristic oscillations of amplitude that begins by increasing over a plurality of periods, then remains constant, and finally decreases over subsequent periods as shown in FIG. 3. The value of the voltage corresponding to a maximum amplitude is referred to as the "peak" voltage $V_{PK}$.

The threshold voltage $V_{TH}$ is proportional to the peak voltage $_{PK}$ of the receive signal such that $V_{TH}=K\times V_{PK}$. The factor K depends on the transducer and it can be determined, for example, by calculation by taking the mean of the amplitudes of two successive oscillations in the receive signal, for example the first two oscillations.

The conditioned output signal $V_{OUT}$ takes on a first state when the voltage of the receive signal $V_{IN}$ is greater than the threshold voltage $V_{TH}$ and a second state when the peak voltage $V_{PK}$ of the receive signal is less than the threshold voltage $V_{TH}$.

In addition, the receive signal $V_{IN}$ proper is usually superposed on an offset voltage $V_{OF}$ which is constant over a duration corresponding to measuring propagation time but which is liable to vary over a plurality of measurements as a function of parameters such as temperature or power supply voltage to the detector device as a whole, for example. It is advantageous to take account of the exact value of this voltage and thus to process the offset voltage so as to ensure that these variations do not disturb $V_{TH}$. Thus, the method includes additional steps consisting in determining the offset voltage $V_{OF}$ at the output from the transducer prior to measuring the receive signal $V_{IN}$, and then in subtracting the value of the offset voltage $V_{OF}$ from the receive signal $V_{IN}$ prior to the step of determining the threshold voltage $V_{TH}$.

FIG. 1 shows the malfunction detector device in a first embodiment of the invention in which the offset voltage is not processed.

The conditioning circuit 1 comprises a selector 10 and a comparator 20. The selector 10 has a first input connected to the input IN receiving the receive signal, and it has a second input receiving the value of the predetermined reference voltage $V_{REF}$. The selector has two functions, one of these functions being to output a threshold voltage $V_{TH}$ which is servo-controlled to the peak value $V_{PK}$ of the receive signal $V_{IN}$, while the other function is to supply an output AL with a malfunction detection signal $V_{AL}$ whenever the peak amplitude $V_{PK}$ of the receive signal is below a predetermined reference voltage $V_{REF}$. The comparator 20 also has a first input connected to the input IN receiving the receive signal, and a second input connected to the selector 10 receiving the threshold voltage $V_{TH}$. The output from the comparator 20 constitutes the output OUT from the conditioning circuit 1 and generates the conditioned output signal $V_{OUT}$.

Figure 1A:
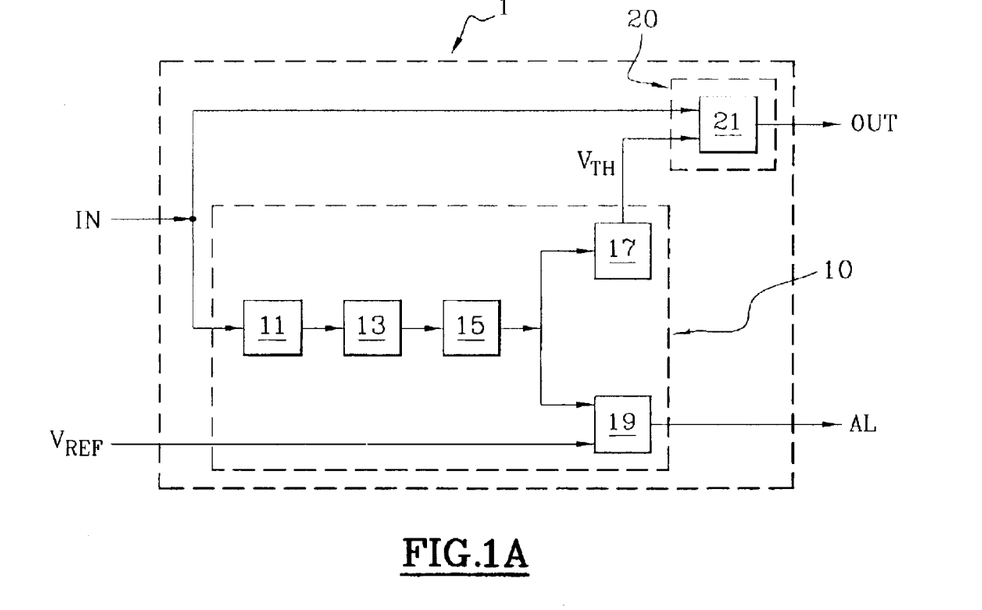
FIG. 1A is a block diagram of the malfunction detector device of FIG. 1, in an analog variant.

A first variant of the malfunction detector device described with reference to FIG. 1 is of the analog type and is shown in FIG. 1A. In this variant, the selector 10 has a peak detector 11, a peak limiter 13, a sample-and-hold circuit 15, a first comparator 19, and a potentiometer divider 17. The peak detector 11 is directly connected to the input IN and receives the receive signal $V_{IN}$. Its function is to store the value of the maximum voltage through which the receive signal passes. The peak limiter 13 is connected to the output of the peak detector 11. It serves to eliminate interference from the receive signal $V_{IN}$, and in particular it outputs a zero signal whenever the peak detector has detected only noise, and it eliminates peaks of large amplitude which do not correspond to the signal of interest. The peak limiter 13 is followed by a sample-and-hold circuit 15 whose function is to store the peak amplitude of the receive signal $V_{PK}$ until the next time a signal is received. The sample-and-hold circuit 15 is connected to the first comparator 19 and to the potentiometer divider 17. The first comparator 19 has a second input receiving the reference voltage $V_{REF}$ and on an output AL it generates a malfunction detection signal $V_{AL}$ when the peak amplitude of the receive signal $V_{PK}$ is less than the reference voltage $V_{REF}$. The potentiometer divider 17 outputs the threshold voltage $V_{TH}$. The output from the potentiometer divider 17 is connected to the second comparator 21 which receives the threshold voltage $V_{TH}$. The comparator 21 has a second input on which it receives the receive signal $V_{IN}$ and on its output OUT it generates the conditioned output signal $V_{OUT}$.

Figure 1B:
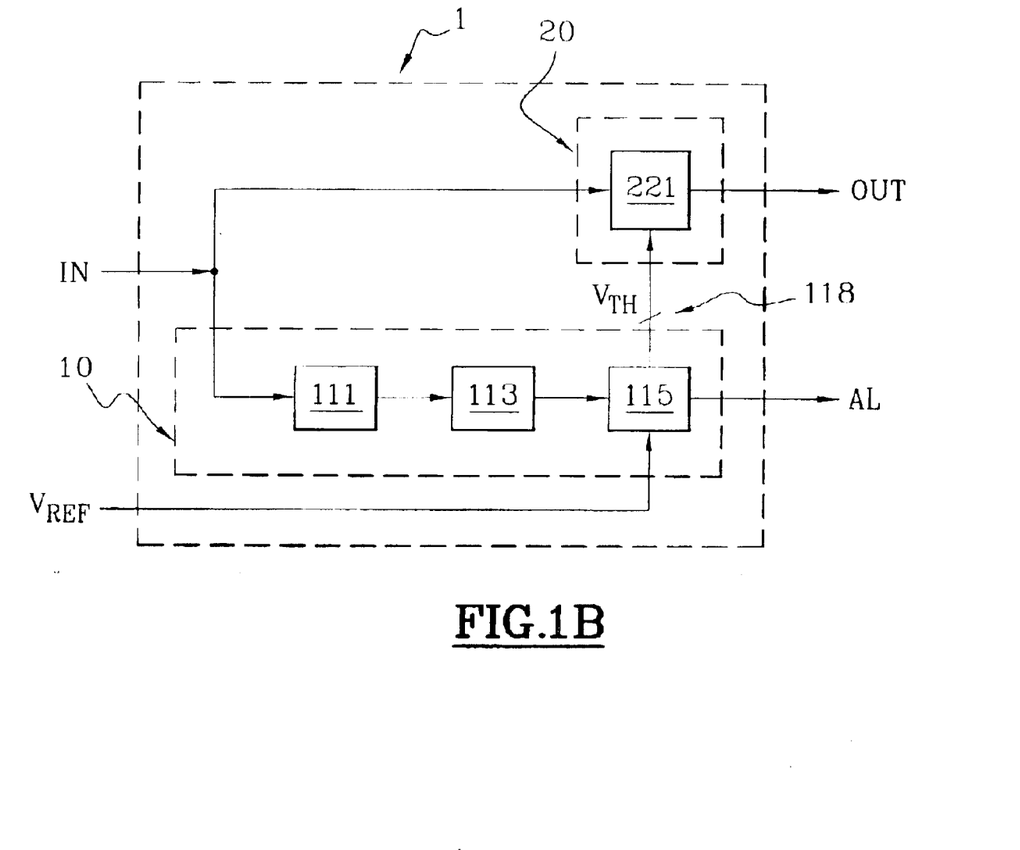
FIG. 1B is a block diagram of the malfunction detector device of FIG. 1, in a digital variant.

In a second variant of digital type, as shown in FIG. 1B, the malfunction detector device has a peak detector 111, an analog-to-digital converter 113, a programmer 115, and a programmable comparator 221. The peak detector 111 is connected to the input IN where it receives the receive signal $V_{IN}$. The analog-to-digital converter 113 is connected to the output of the peak detector 111. It serves to digitize the receive signal $V_{IN}$. It is followed by the programmer 115 which has a second input receiving the reference voltage $V_{REF}$. On the output AL, the programmer generates the malfunction detection signal $V_{AL}$ whenever the peak amplitude of the receive signal $V_{PK}$ is less than the reference voltage $V_{REF}$, and it also generates the program threshold voltage $V_{TH}$. The programmer 115 is connected to the programmable comparator 221 by a data bus 118. The programmable comparator 221 compares the signal applied to its input with the programmed threshold voltage $V_{TH}$ applied via the data bus 118, and it generates the conditioned output signal $V_{OUT}$.

To perform the function of the programmer 115, it is advantageous to use a demultiplexer or a microcontroller.

FIG. 2 shows the malfunction detector device constituting a second embodiment of the invention, including processing of the offset voltage.

The conditioning circuit 1 comprises a selector 10, a comparator 20, and a unit 30 for determining the offset voltage. The unit 30 for determining the offset voltage is connected to the input IN of the conditioning circuit 1. Before the beginning of each reception of an ultrasound wave, said unit samples and stores the offset voltage $V_{OF}$. The selector 10 has a first input connected to the input IN receiving the receive signal, a second input receiving the value of the offset voltage $V_{OF}$, and a third input receiving the value of the reference voltage $V_{REF}$. The selector 10 outputs firstly a threshold voltage $V_{TH}$ servo-controlled to the peak amplitude $V_{PK}$ of the receive signal $V_{IN}$, and secondly a malfunction detection signal $V_{AL}$ whenever the peak amplitude of the receive signal $V_{PK}$ is less than a predetermined reference voltage $V_{REF}$. The comparator 20 has a first input connected to the input IN receiving the receive signal, a second input connected to the selector receiving the threshold voltage $V_{TH}$, and a third input receiving the value of the offset voltage $V_{OF}$. The output from the comparator constitutes the output OUT of the conditioning circuit 1 and generates the conditioned output signal $V_{OUT}$.

Figure 2A:
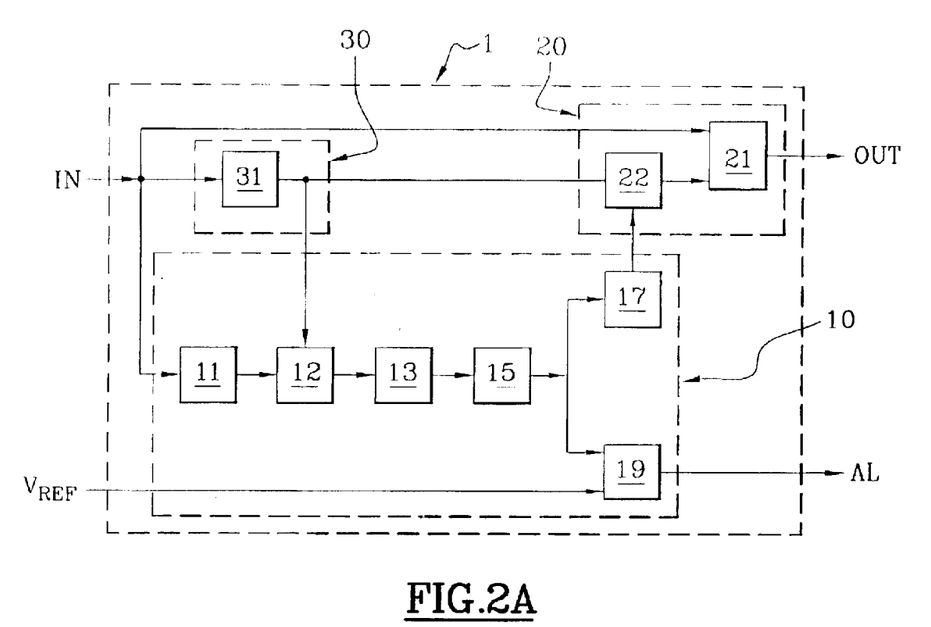
FIG. 2A is a block diagram of the malfunction detector device of FIG. 2 in an analog variant.

A first variant of the malfunction detector device described with reference to FIG. 2 is of analog type and is shown in FIG. 2A. In this variant, the unit 30 for determining the offset voltage comprises a first sample-and-hold circuit 31 receiving the receive signal $V_{IN}$ and serving to determine and store the offset voltage $V_{OF}$ present before the beginning of receiving an ultrasound wave. The selector 10 has a peak detector 11, a subtracter 12, a peak limiter 13, a sample-and-hold circuit 15, a first comparator 19, and a potentiometer divider 17. The peak detector 11 is connected to the input IN and receives the receive signal $V_{IN}$. The subtracter 12 connected to the output of the peak detector 11 and to the output of the first sample-and-hold circuit 31 is designed to subtract the offset voltage $V_{OF}$ from the signal output by the peak detector 11. The peak limiter 13 is connected to the output of the subtracter 12. It serves to eliminate interference from the receive signal $V_{IN}$, in particular it outputs a zero signal when the peak detector is detecting noise only, and it eliminates large amplitude peaks which do not correspond to the signal of interest. The peak limiter 13 is followed by a sample-and-hold circuit 15 whose function is to store the peak amplitude of the receive signal $V_{PK}$ until the following signal is received. The sample-and-hold circuit 15 is connected to the first comparator 19 and to the potentiometer divider 17. The first comparator 19 has a second input receiving the reference voltage $V_{REF}$ and has an output AL on which it generates a malfunction detection signal $V_{AL}$ whenever the peak amplitude of the receive signal $V_{PK}$ is less than the reference voltage $V_{REF}$. The potentiometer divider 17 outputs the threshold voltage $V_{TH}$.

The comparator 20 comprises an analog adder 22 connected to the output from the potentiometer divider 17 and to the first sample-and-hold circuit 31. The analog adder 22 sums the offset voltage $V_{OF}$ and the threshold voltage $V_{TH}$. A second comparator 21 having a first input connected to the output of said adder 22 and a second input receiving the receive signal $V_{TH}$ generates the conditioned output signal $V_{OUT}$ in a first state when the amplitude of the receive signal is greater than the sum of the voltages, and in a second state when the amplitude of the receive signal is less than the sum of the voltages.

Figure 2B:
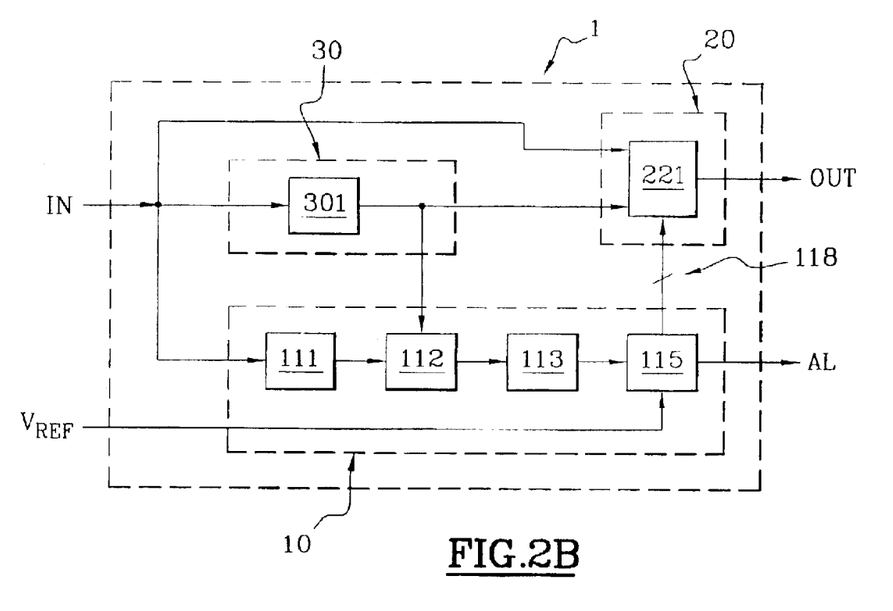
FIG. 2B is a block diagram of the malfunction detector device of FIG. 2 in a digital variant.

In a second variant that is of the digital type, and as shown in FIG. 2B, the malfunction detector device comprises a sample-and-hold circuit 301, a peak detector 111, a subtracter 112, an analog-to-digital converter 113, a programmer 115, and a programmable comparator 221. The sample-and-hold circuit 301 receives the receive signal $V_{IN}$, determining and storing the offset voltage present prior to the beginning of receiving an ultrasound wave. The peak detector 111 is connected to the input IN from which it receives the receive signal $V_{IN}$. The subtracter 112 connected to the output of the peak detector 111 and to the output of the first sample-and-hold circuit 301 is designed to subtract the offset voltage $V_{OF}$ from the signal output by the peak detector 111. The analog-to-digital converter 113 is connected to the output from the subtracter 112. It is designed to digitize the receive signal $V_{IN}$. It is followed by the programmer 115 which has a second input receiving the reference voltage $V_{REF}$. At the output AL, the programmer generates the malfunction detection signal $V_{AL}$ when the peak amplitude of the receive signal $V_{PK}$ is less than the reference voltage $V_{REF}$, and it also generates a programmed threshold voltage $V_{TH}$. The programmer 115 is connected to the programmable comparator 221 via a data bus 118. The programmable comparator 221 compares the signals applied to its two inputs and adds thereto the programmed threshold voltage $V_{TH}$ as delivered by the bus 118. In this manner, said comparator 221 generates the conditioned output signal $V_{OUT}$.

To implement the function of the programmer 115, it is advantageous to use a demultiplexer or a microcontroller.

Figure 4:
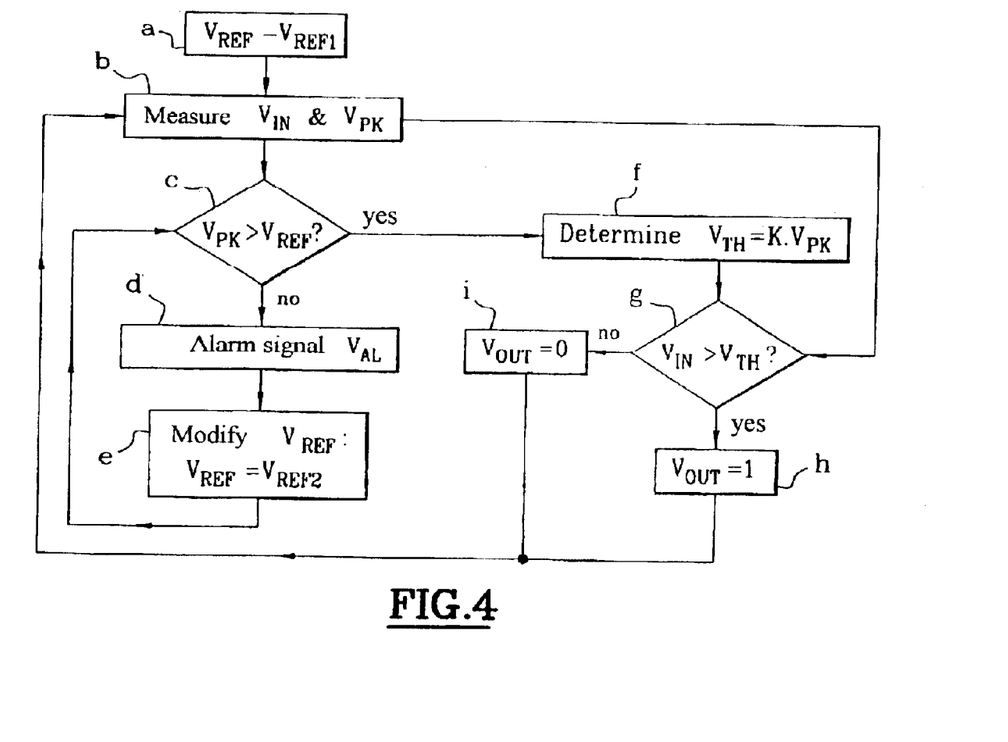
FIG. 4 shows the succession of steps in the method of detecting malfunction in accordance with the invention, and including processing of the offset voltage.

FIG. 4 is a flow chart showing the various steps in the method in the first embodiment of the invention, i.e. without processing the offset voltage.

Initially the reference voltage $V_{REF}$ is equal to a first reference voltage $V_{REF1}$ (step a).

The peak amplitude $V_{PK}$ of the receive signal $V_{IN}$ output by the transducer is measured (step b). This signal comprises a series of characteristic oscillations of amplitude that begins by growing over several periods, after which it is constant, with the value of the voltage corresponding to a maximum amplitude being referred to as the peak voltage $V_{PK}$, and finally it decreases over the following periods. The peak amplitude $V_{PK}$ is compared with the reference voltage $V_{REF1}$ as determined above (step c).

When the peak amplitude $V_{PK}$ of the receive signal is less than the level of the reference voltage $V_{REF1}$ an alarm signal $V_{AL}$ is generated (step d). This first signal is generated while the transducer is still delivering a receive signal that can be used by the measurement electronics, but it nevertheless constitutes a first warning of future malfunction. Under such circumstances, the reference voltage $V_{REF}$ is modified and goes from the first reference voltage $V_{REF1}$ to a second reference voltage $V_{REFS}$ (step e).

When the peak amplitude $V_{PK}$ of the receive signal is greater than the level of the reference voltage $V_{REF}$, a threshold voltage $V_{TH}$ proportional to the peak amplitude $V_{PK}$ of the receive signal is determined (step f). The threshold voltage $V_{TH}$ is defined in such a manner that $V_{TH}=K \times V_{PK}$, where K is a factor that depends on the transducer.

The receive signal $V_{IN}$ is compared with the threshold voltage $V_{TH}$ as determined during the preceding step (step g). A conditioned output signal $V_{OUT}$ is then generated, said signal being in a first state when the receive signal $V_{IN}$ is greater than the threshold voltage $V_{TH}$ (step h), and in a second state when the receive signal $V_{IN}$ is lower than the threshold voltage $V_{TH}$ (step i). This conditioned signal is shown in FIG. 3.

When the reference voltage $V_{REF}$ is equal to the second reference voltage $V_{REF2}$, and if the peak amplitude $V_{PK}$ of the receive signal is less than the reference voltage level $V_{REF2}$, then another alarm signal $V_{AL}$ is generated (step d). The second alarm signal is generated when the transducer is no longer delivering a receive signal that is genuinely usable by the measurement electronics. The method is then locked in a loop constituted by a succession of steps c, d, and e until the malfunction has been repaired by a maintenance team enabling the method to return to step a.

In a variant embodiment (not shown in FIG. 4), the malfunction detection method has two additional steps which consist firstly in determining an offset voltage $V_{OF}$ at the output from the transducer prior to measuring the receive signal $V_{IN}$ (step b), and secondly in subtracting the value of the offset voltage $V_{OF}$ from the receive signal $V_{IN}$ prior to the step of determining the threshold voltage $V_{TH}$ (step f).

What is claimed is:

1. A method of detecting malfunction such as clogging or aging in an ultrasound flowmeter, said flowmeter having at least one transducer, said method also enabling a conditioned signal to be generated from an analog signal from said transducer, the method comprising the following steps:

measuring the receive signal $V_{IN}$ output by the transducer; and comparing a characteristic of the receive signal with a predetermined reference characteristic $V_{REF}$;

said method being characterized in that it comprises the following additional steps:

storing a peak voltage $V_{PK}$ of the receive signal $V_{IN}$;

generating an alarm signal $V_{AL}$ when a trigger characteristic $V_{DEC}$ of the receive signal $V_{IN}$ is less than the predetermined reference characteristic $V_{REF}$;

defining a threshold voltage $V_{TH}$ proportional to the peak amplitude $V_{PK}$ of the receive signal in such a manner that $V_{TH}=K \times V_{PK}$, K being a factor depending on the transducer;

comparing the receive signal $V_{IN}$ with the threshold voltage $V_{TH}$; and generating a conditioned output signal $V_{OUT}$ in a first state when the receive signal $V_{IN}$ is greater than the threshold voltage $V_{TH}$, and in a second state when the receive signal $V_{IN}$ is less than the threshold voltage $V_{TH}$.

2. A method of detecting malfunction of a flowmeter according to claim 1, the method being characterized in that the reference characteristic $V_{REF}$ is a voltage, and the trigger characteristic $V_{DEC}$ is the peak voltage $V_{PK}$ of the receive signal $V_{IN}$.

3. A method of detecting malfunction of a flowmeter according to claim 1, characterized in that the reference characteristic $V_{REF}$ is a derivative of voltage, and the trigger characteristic $V_{DEC}$ is a derivative of the peak voltage $V_{PK}$ of the receive signal $V_{IN}$.

4. A method of detecting malfunction of a flowmeter according to claim 1, characterized in that the receive signal $V_{IN}$ output by the transducer is used simultaneously for generating the alarm signal $V_{AL}$, the conditioned output signal $V_{OUT}$, and for defining the threshold voltage $V_{TH}$.

5. A method of detecting malfunction of a flowmeter according to claim 1, characterized in that the reference voltage $V_{REF}$ is initially equal to a first reference voltage $V_{REF1}$, which is selected in such a manner that the alarm signal is generated before the transducer ceases to supply any receive signal, said reference voltage $V_{REF}$ being equal to a second reference voltage $V_{REF2}$ as soon as a first alarm signal $V_{AL}$ is generated, the second reference voltage $V_{REF2}$ being selected in such a manner that a second alarm signal is generated when the transducer ceases to supply any receive signal.

6. A method of detecting malfunction of a flowmeter according to claim 1, characterized in that it includes the following additional steps:

determining an offset voltage $V_{OF}$ at the output from the transducer prior to measuring the receive signal $V_{IN}$; and subtracting the value of the offset voltage $V_{OF}$ from the receive signal $V_{IN}$ before the step of determining the threshold voltage $V_{TH}$.

7. A method of detecting malfunction of a flowmeter according to claim 1, characterized in that the factor K is determined by calculation, taking the average of the amplitudes of two successive oscillations in the receive signal.

8. A device for detecting malfunction such as clogging or aging of an ultrasound flowmeter, said flowmeter comprising at least one transducer delivering a receive signal $V_{IN}$, said device also serving to generate a conditioned signal from an analog signal delivered by said transducer, the device comprising:

a conditioning circuit (1) for conditioning the receive signal and comprising an input IN connected to the transducer and an output OUT delivering a conditioned output signal $V_{OUT}$;

the device being characterized in that the conditioning circuit further comprises:

a selector (10) having one input connected to the input IN, and receiving on another input the value of the predetermined reference voltage VREF, said selector delivering at its output a threshold voltage $V_{TH}$ servo-controlled to the receive signal $V_{IN}$, and at an output AL a malfunction detection signal $V_{AL}$ when the peak amplitude of the receive signal $V_{PK}$ is less than a predetermined reference voltage $V_{REF}$; and a comparator (20) having a first input connected to the input IN to receive the receive signal $V_{IN}$ and a second input connected to the selector to receive the threshold voltage $V_{TH}$, an output from the comparator constituting the output OUT of the conditioning circuit generating a conditioned output signal $V_{OUT}$ that is in a first state when the amplitude of the receive signal is greater than the value of the threshold voltage, and in a second state when the amplitude of the receive signal is less than the value of the threshold voltage $V_{TH}$.

9. A device for detecting malfunction of a flowmeter according to claim 8, the device being characterized in that: the selector (10) comprises:

a peak detector (11) receiving the receive signal $V_{IN}$;
a peak limiter (13) connected to the output of the peak detector (11) and designed to eliminate interference from the receive signal $V_{IN}$;
a sample-and-hold circuit (15) connected to the peak limiter (13) and designed to store the peak amplitude $V_{PK}$ of the receive signal $V_{IN}$;
a first comparator (19) connected to the output of the sample-and-hold circuit (15) having a second input receiving the reference voltage $V_{REF}$ and generating on an output AL the malfunction detection signal $V_{AL}$ when the peak amplitude of the receive signal $V_{PK}$ is less than the reference voltage $V_{REF}$;
a potentiometer divider (17) connected to the output of the sample-and-hold circuit (15) to deliver the threshold voltage $V_{TH}$; and
the comparator (20) comprises a second comparator (21) connected to the output of the potentiometer divider (17) an having a second input receiving the receive signal $V_{IN}$ and generating the conditioned output signal $V_{OUT}$ in a first state when the amplitude of the receive signal is greater than the value of the threshold voltage, and in a second state when the amplitude of the receive signal is less than the value of the threshold voltage.

10. A device for detecting malfunction of a flowmeter according to claim 8, characterized in that: the selector (10) comprises:

a peak detector (113) receiving the receive signal $V_{IN}$;
an analog-digital converter (113) connected to the output of the peak detector (111);
a programmer (115) connected to the converter (113) and receiving on a second input the reference voltage $V_{REF}$, said programmer generating on an output AL the malfunction detection signal $V_{AL}$ when the peak amplitude of the receive signal $V_{PK}$ is less than the reference voltage $V_{REF}$, and also delivering a programmed threshold voltage $V_{TH}$; and
the comparator (20) comprises a programmable comparator (221) whose threshold voltage $V_{TH}$ is defined by the programmer (115) via a data bus (118) and which has another input receiving the receive signal $V_{IN}$, said programmer comparator generating the conditioned output signal $V_{OUT}$ in a first state when the amplitude of the receive signal is greater than the value of the threshold voltage, and in a second state when the amplitude of the receive signal is less than the value of the threshold voltage $V_{TH}$.

11. A device for detecting malfunction of a flowmeter according to claim 10, characterized in that the programmer (115) is a demultiplexer.

12. A device for detecting malfunction of a flowmeter according to claim 10, characterized in that the programmer (115) is a microcontroller.

13. A device for detecting malfunction of a flowmeter according to claim 8, characterized in that it further comprises a unit (30) for determining the offset voltage $V_{OF}$ connected to the input IN of the conditioning circuit (1), the output of said unit being connected to an input of the selector (10) and to an input of the comparator (20).

14. A device for detecting malfunction of a flowmeter according to claim 13, characterized in that:

the unit (30) for determining the offset voltage $V_{OF}$ comprises a first sample-and-hold circuit (31) receiving the receive signal $V_{IN}$ and designed to store the offset voltage $V_{OF}$;
the selector (10) comprises:
a peak detector (11) receiving the receive signal $V_{IN}$;
a subtracter (12) connected to the output of the peak detector (11) and to the output of the first sample-and-hold circuit (31), designed to subtract the offset voltage $V_{OF}$ from the output signal of the sample-and-hold circuit;
a peak limiter (13) connected to the output of the subtracter (12) and designed to eliminate interference from the receive signal $V_{IN}$;
a second sample-and-hold circuit (15) connected to the peak limiter (13) and designed to store the peak amplitude $V_{PK}$ of the receive signal $V_{IN}$;
a first comparator (19) connected to the output of the sample-and-hold circuit (15), having a second input receive the reference voltage $V_{REF}$ and having an output AL on which it generates the malfunction detection signal $V_{AL}$ when the peak amplitude of the receive signal $V_{PK}$ is less than the reference voltage $V_{REF}$;
a potentiometer divider (17) connected to the output of the sample-and-hold circuit (15) to deliver the threshold voltage $V_{TH}$; and
the comparator (20) has an analog adder (22) connected to the output of the potentiometer divider (17) and to the first sample-and-hold circuit (31) and summing the offset voltage $V_{OF}$ and the threshold voltage $V_{TH}$, and a second comparator (21) connected via a first input to the output of said adder (22) and receiving on a second input the receive signal $V_{IN}$, said comparator (21) generating the conditioned output signal $V_{OUT}$ in a first state when the amplitude of the receive signal is greater than the value of the sum of the voltages, and in a second state when the amplitude of the receive signal is less than the value of the sum of the voltages.

15. A device for detecting malfunction of a flowmeter according to claim 13, characterized in that:

the unit (30) for determining the offset voltage $V_{OF}$ comprises:
a sample-and-hold circuit (301) receiving the receive signal $V_{IN}$ and designed to store the offset voltage $V_{OF}$;
the selector (10) comprises:
a peak detector (111) receiving the receive signal $V_{IN}$;
a subtracter (112) connected to the output of the peak detector (111) and to the output of the sample-and-hold circuit (301), and designed to subtract the offset voltage $V_{OF}$ from the output signal of the sample-and-hold circuit;

an analog-to-digital converter (113) connected to the output of the subtracter (112);

a programmer (115) connected to the converter (113) and receiving on a second input the reference voltage $V_{REF}$, said programmer having an output AL on which it generates the malfunction detection signal $V_{AL}$ when the peak amplitude of the receive signal $V_{PK}$ is less than the reference voltage $V_{REF}$, and also generating a programmed threshold voltage $V_{TH}$; and the comparator (20) comprises a programmable comparator (221) whose threshold voltage $V_{TH}$ is defined by the programmer (115) via a data bus (118) and which receives the receive signal $V_{IN}$ on one input and the offset voltage $V_{OF}$ from the sample-and-hold circuit (301) on another input, said programmable comparator generating the conditioned output signal $V_{OUT}$ in a first state when the amplitude of the receive signal is greater than the value of the threshold voltage, and in a second state when the amplitude of the receive signal is less than the value of the threshold voltage $V_{TH}$.

16. A device for detecting malfunction of a flowmeter according to claim 15, characterized in that the programmer (115) is a demultiplexer.

17. A device for detecting malfunction of a flowmeter according to claim 15, characterized in that the programmer (115) is a microcontroller.

* * * * *

UNITED STATES PATENT AND TRADEMARK OFFICE
CERTIFICATE OF CORRECTION

PATENT NO. : 6,766,276 B1 Page 1 of 1
APPLICATION NO. : 10/169339
DATED : July 20, 2004
INVENTOR(S) : Herve Dury It is certified that error appears in the above-identified patent and that said Letters Patent is hereby corrected as shown below:

<u>Title Page #54 and column 1</u>

*Ulatrasonic* should read ULTRASONIC

Title Page #22

The PCT filing date should be December 19, 1999

Signed and Sealed this

Tenth Day of October, 2006

JON W. DUDAS
*Director of the United States Patent and Trademark Office*